(12) United States Patent
Takizawa et al.

(10) Patent No.: US 10,539,863 B2
(45) Date of Patent: Jan. 21, 2020

(54) ELECTRO-OPTICAL DEVICE, LIGHTING DEVICE, AND PROJECTOR

(71) Applicant: SEIKO EPSON CORPORATION, Tokyo (JP)

(72) Inventors: Takahiro Takizawa, Suzaka (JP); Masato Kadotani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 63 days.

(21) Appl. No.: 16/069,068

(22) PCT Filed: Jan. 11, 2017

(86) PCT No.: PCT/JP2017/000637
§ 371 (c)(1),
(2) Date: Jul. 10, 2018

(87) PCT Pub. No.: WO2017/126387
PCT Pub. Date: Jul. 27, 2017

(65) Prior Publication Data
US 2019/0025682 A1    Jan. 24, 2019

(30) Foreign Application Priority Data

Jan. 20, 2016  (JP) ................................ 2016-008517

(51) Int. Cl.
*G03B 21/00*    (2006.01)
*G03B 21/20*    (2006.01)
(Continued)

(52) U.S. Cl.
CPC .............. *G03B 21/204* (2013.01); *F21V 9/30* (2018.02); *G03B 21/14* (2013.01); *G03B 21/145* (2013.01);
(Continued)

(58) Field of Classification Search
CPC .... G03B 21/14; G03B 21/145; G02B 27/149; H04N 9/3141; H04N 9/3144; H04N 9/3155; H04N 9/3194
See application file for complete search history.

(56) References Cited

U.S. PATENT DOCUMENTS

| 6,350,033 | B1 | 2/2002 | Fujimori | |
| 2013/0264434 | A1* | 10/2013 | Unno | G03B 21/14 248/58 |
| 2016/0353067 | A1* | 12/2016 | Kadotani | H04N 9/3144 |

FOREIGN PATENT DOCUMENTS

| JP | 2000-221598 A | 8/2000 |
| JP | 2001-244657 A | 9/2001 |
| jp | 2014-092599 A | 5/2014 |

OTHER PUBLICATIONS

Mar. 7, 2017 International Search Report issued in International Patent Application No. PCT/JP2017/000637.

* cited by examiner

*Primary Examiner* — Karabi Guharay
(74) *Attorney, Agent, or Firm* — Oliff PLC

(57) ABSTRACT

An electro-optical device includes a cable connected to an electronic component, a storage casing that stores the electronic component and an optical component and has an insertion hole through which the cable is inserted, a fixing portion that is fixed to the storage casing, and an elastic portion that is fixed to the fixing portion. The fixing portion has a first opposing portion and a second opposing portion that are disposed opposite to each other with the cable that protrudes from the insertion hole, interposed therebetween, and the elastic portion includes a first protruding portion and a second protruding portion, and the first protruding portion and the second protruding portion are pressed against each (Continued)

other with the cable interposed therebetween and are disposed so as to surround a vicinity of the cable.

16 Claims, 8 Drawing Sheets

(51) Int. Cl.
*F21V 9/30* (2018.01)
*G03B 21/14* (2006.01)
*H04N 9/31* (2006.01)
*G02B 27/14* (2006.01)
*G02B 26/00* (2006.01)
*G03B 33/12* (2006.01)

(52) U.S. Cl.
CPC ....... *G03B 21/2013* (2013.01); *H04N 9/3141* (2013.01); *H04N 9/3155* (2013.01); *H04N 9/3158* (2013.01); *H04N 9/3194* (2013.01); *G02B 26/007* (2013.01); *G02B 27/149* (2013.01); *G03B 21/006* (2013.01); *G03B 33/12* (2013.01)

ELECTRO-OPTICAL DEVICE, LIGHTING DEVICE, AND PROJECTOR

BACKGROUND

1. Technical Field

The present invention relates to an electro-optical device, a lighting device, and a projector.

2. Related Art

In recent years, a device provided with an electronic component and an optical component is known. For example, an optical conversion device used in a light source device of the projector is proposed (refer to JP-A-2014-92599).

The optical conversion device disclosed in PTL 1 includes a fluorescent substance wheel device, a blowing machine, and a fluorescent substance wheel case accommodating the fluorescent substance wheel device and the blowing machine.

The fluorescent substance wheel device includes a fluorescent substance wheel (optical component) in which a fluorescent substance layer is formed, and a motor (electronic component) that rotates the fluorescent substance wheel. The blowing machine blows wind to a fluorescent substance light emitting portion of the fluorescent substance layer. The fluorescent substance wheel case has a circulation path that is formed to make the wind from the blowing machine flow in one direction, and constitutes a sealed space.

However, it is assumed to be difficult to achieve sealing property with the technology disclosed in PTL 1. In other words, the motor (electronic component) is assumed to be connected to a control unit disposed on an outside of the fluorescent substance wheel case through a connecting portion such as a cable. For this reason, a hole through which the cable passes is formed in the fluorescent substance wheel case. When dust from the outside intrudes onto an optical path of the fluorescent substance layer in the fluorescent substance wheel case through the hole, an absorption or scattering of excitation light to the fluorescent substance layer or emission light from the fluorescent substance layer occurs. In other words, with the technology disclosed in PTL 1, there has been a problem that light utilization efficiency deteriorates.

SUMMARY

The invention has been made to solve at least a part of the problems described above, and can be implemented as the following embodiments or application examples.

APPLICATION EXAMPLE 1

An electro-optical device according to this application example includes: an electronic component; an optical component; a connecting portion that is electrically connected to the electronic component; a storage casing that stores the electronic component and the optical component, and has an insertion hole through which the connecting portion is inserted; a fixing portion that is attachably and detachably fixed to the storage casing; and an elastic portion that is fixed to the fixing portion. The fixing portion has a first opposing portion and a second opposing portion that are disposed opposite to each other with the connecting portion that protrudes from the insertion hole, interposed therebetween, the elastic portion has a first protruding portion that protrudes toward the connecting portion side from the first opposing portion, and a second protruding portion that protrudes toward the connecting portion side from the second opposing portion, and the first protruding portion and the second protruding portion are pressed against each other with the connecting portion interposed therebetween, and disposed so as to surround a vicinity the connecting portion.

According to this configuration, since the insertion hole through which the connecting portion is inserted can be sealed by the elastic portion fixed to the fixing portion, it is possible to form a sealed space that prevents intrusion of dust from outside in the storage casing. Since adhesion of dust to the optical component in the storage casing can be prevented, it is possible to provide the electro-optical device that can sufficiently exert the optical performance of the optical component while controlling the electronic component from outside.

Furthermore, in a configuration different from the application example in which the elastic member is attached to the peripheral edge of the insertion hole via the adhesive material such as a double-sided tape or the like in order to close the insertion hole, an operation for securing sealing property or a replacing operation due to deterioration of the elastic member becomes complicated. However, according to the configuration of the application example, it is possible to secure the sealing property and perform replacement of the fixing portion to which the elastic portion is fixed with easy operation of fixing and detaching the fixing portion.

APPLICATION EXAMPLE 2

In the electro-optical device according to the application example, it is preferable that the fixing portion includes a first member that has the first opposing portion and a second member that has the second opposing portion, the elastic portion includes a first elastic member that has the first protruding portion and is fixed to the first opposing portion and a second elastic member that has the second protruding portion and is fixed to the second opposing portion, and the storage casing has a positioning portion that positions the first member and the second member so that the first opposing portion and the second opposing portion are disposed opposite to each other.

According to this configuration, an operator can seal the insertion hole through which the connecting portion is inserted by positioning the first member fixed with the first elastic member and the second member fixed with the second elastic member with the positioning portion and fixing in the storage casing. Accordingly, it is possible to dispose the fixing portion fixed with the elastic portion at the predetermined position of the storage casing and seal the insertion hole through which the connecting portion is inserted with a simple configuration and a simple operation.

APPLICATION EXAMPLE 3

In the electro-optical device according to the application example, it is preferable that the first opposing portion and the second opposing portion extend along a second direction that intersects a first direction that the first opposing portion and the second opposing position are opposite to each other, the first member has a first hole forming portion that protrudes from one end of the first opposing portion in the second direction and has a through-hole that penetrates the first hole forming portion in a third direction that intersects the first direction and the second direction, the second member has a second hole forming portion that protrudes from one end of the second opposing portion in the second direction and has a through-hole that penetrates the second hole forming portion in the third direction, the first protruding portion of the first elastic member is provided on a side that the first hole forming portion of the first opposing portion protrudes, the second protruding portion of the second elastic member is provided on a side that the second hole forming portion of the second opposing portion protrudes, in the storage casing, a first positioning projection and a second positioning projection as the positioning portion that are inserted into each through-hole of the first hole forming portion and the second hole forming portion are formed, and the fixing portion is disposed so that the first hole forming portion, the first opposing portion, the second hole forming portion and the second opposing portion surround the connecting portion.

According to this configuration, the first member and the second member are formed in an L shape in plan view, and the first elastic member and the second elastic member are fixed to one of the L-shaped pieces. The first member and the second member are disposed so that the first positioning projection and the second positioning projection are inserted into the respective through-holes and surround the connecting portion. Accordingly, it is possible to commonalize the first member and the second member, and commonalize the first elastic member and the second elastic member. Furthermore, it is possible to dispose the fixing portion compactly around the connecting portion. Therefore, it is possible to simplify manufacturing and to provide the electro-optical device including a small fixing portion and an elastic portion.

APPLICATION EXAMPLE 4

In the electro-optical device according to the application example, it is preferable that each of the first positioning projection and the second positioning projection is provided with a screw hole, and each of the first opposing portion and the second opposing portion is positioned to approach each other by a rotation around the screw holes of the first positioning projection and the second positioning projection in a clockwise direction when viewing from an opposite side of the storage casing with respect to each of the first hole forming portion and the second hole forming portion.

According to this configuration, the first member and the second member can be easily fixed to the predetermined positions of the storage casing by inserting the screw into the through-hole. Also, when the first member and the second member are screwed using a standard right-handed screw (screw that generates a tightening force by rotation in clockwise direction), when viewed from the above-mentioned side (head side of screw), forces are applied to both members to rotate in a clockwise direction. Since the first opposing portion and the second opposing portion are formed as described above, the first protruding portion and the second protruding portion are further provided with a force in the direction pressing against each other. Accordingly, it is possible to reliably realize the configuration that the first protruding portion and the second protruding portion are pressed against each other with the connecting portion interposed therebetween with an easy operation without using a special screw or screwing while pressing the first member and the second member.

APPLICATION EXAMPLE 5

In the electro-optical device according to the application example, it is preferable that the fixing portion has a base portion that connects one end sides of the first opposing portion and the second opposing portion that are opposite to each other, and the storage casing has a holding portion that holds the first opposing portion and the second opposing portion in a direction that the first opposing portion and the second opposing portion are opposite to each other.

According to this configuration, when the fixing portion is held by the holding portion, the first opposing portion and the second opposing portion that are disposed with the connecting portion protruding from the insertion hole interposed therebetween are pressed in a direction in which the first opposing portion and the second opposing portion approach each other. As a result, the first protruding portion protruding from the first opposing portion and the second protruding portion protruding from the second opposing portion are reliably pressed against each other with the connecting portion interposed therebetween. As a result, it is possible to dispose the fixing portion to which the elastic portion is fixed at the predetermined position of the storage casing with a simple configuration and simple operation, and to close the insertion hole through which the connecting portion is inserted.

APPLICATION EXAMPLE 6

In the electro-optical device according to the application example, it is preferable that the storage casing has a corner portion that has a first outer surface and a second outer surface extending in a direction intersecting each other, the insertion hole is provided on the corner portion, and the first opposing portion and the second opposing portion are formed along the first outer surface and the second outer surface.

According to this configuration, the connecting portion connected to the electronic component disposed in the corner in the storage casing can be taken out to the outside of the storage casing in a space efficient manner and the insertion hole through which the connecting portion is inserted can be closed.

APPLICATION EXAMPLE 7

In the electro-optical device according to the application example, it is preferable that the storage casing includes a first casing that has the first outer surface and an opening portion that opens in a direction along the first outer surface and is provided with the optical component, and a second casing that has the second outer surface and closes the opening portion, the base portion side of the fixing portion is fixed to the second casing, and the holding portion is provided in the second casing.

According to this configuration, in addition to the easy attachment and detachment of the fixing portion, it is possible to disassemble the first casing and the second casing in a state in which the fixing portion is fixed to the second casing. Therefore, even in a case where the replacement of the fixing portion is not required, it is possible to repair or replace members such as optical components disposed in the first casing without removing the fixing portion.

APPLICATION EXAMPLE 8

A lighting device according to this application example includes a light source that emits excitation light; and the above-described electro-optical device. The optical component has a fluorescent substance, and is a wavelength conversion element that emits fluorescence using the excitation light, and the electronic component is a driving unit that rotates the wavelength conversion element.

According to this configuration, it is possible to provide the lighting device that the wavelength conversion element emits fluorescence by the excitation light of the light source, and emits light including this fluorescence. Since the wavelength conversion element is rotated by the driving unit, the area of the fluorescent substance with which the excitation light is irradiated moves, and the fluorescent substance is prevented from locally becoming high temperature. Accordingly, it is possible to provide the lighting device that suppresses thermal deterioration of the fluorescent substance and illuminates the area to be illuminated over a long period of time.

In addition, since the wavelength conversion element and the driving unit are disposed in storage casing, dust is prevented from adhering to the surface of the fluorescent substance. Therefore, it is possible to provide the lighting device capable of suppressing the absorption and scattering of the excitation light or the emission light from the fluorescent substance due to dust, with emission of enhanced light utilization efficiency, and replacing the fixing portion to which the elastic portion is fixed with an easy operation.

APPLICATION EXAMPLE 9

A projector according to this application example includes the above-described lighting device; an optical modulation device that modulates light emitted from the lighting device; a projection optical device that projects the light emitted from the optical modulation device; and a control unit that is connected with the connecting portion and controls an operation of the projector.

According to this configuration, since the projector includes the above-described lighting device, it is possible to enhance the efficiency of the light emitted from the light source and to project an image in which reduction in brightness is suppressed over a long period of time.

APPLICATION EXAMPLE 10

A projector according to this application example includes a light source; the above-described electro-optical device on which light emitted from the light source is incident; a projection optical device that projects light emitted from the electro-optical device; and a control unit that is connected with the connecting portion and controls an operation of the projector.

According to this configuration, since the projector includes the above-described electro-optical device, it is possible to maintain the optical performance of the optical component and to project an image with good image quality over a long period of time.

DESCRIPTION OF EXEMPLARY EMBODIMENTS (First Embodiment)

Figure 1:
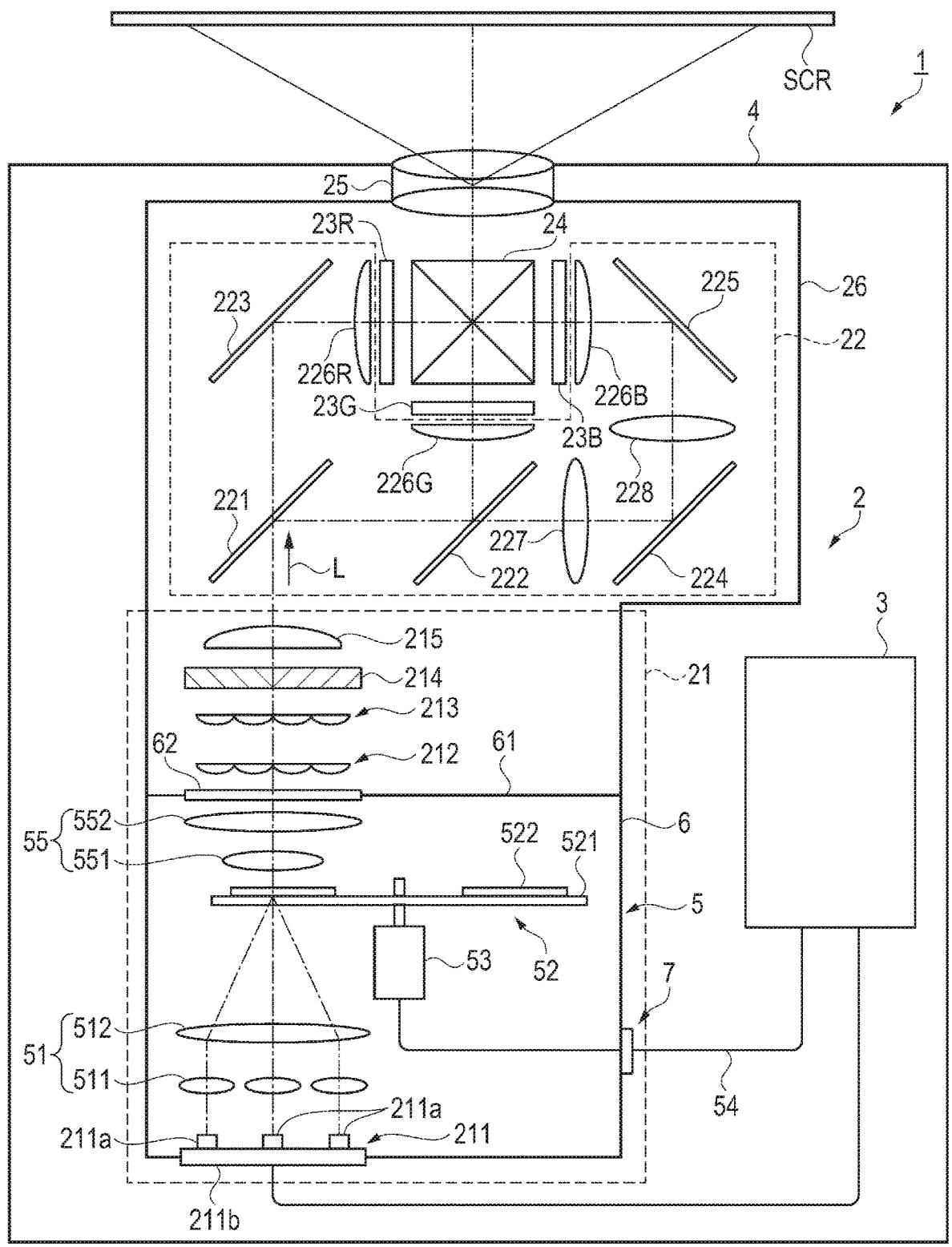
FIG. 1 is a schematic diagram illustrating a main configuration of a projector of a first embodiment.

Hereinafter, a light source device, a lighting device, and a projector according to the embodiment will be explained with reference to the drawings. In each of the drawings shown below, in order to make the constituent elements large enough to be recognized on the drawing, the dimensions and ratios of the respective constituent elements are properly made different from the actual ones.

[Main Configuration of Projector]

FIG. 1 is a schematic diagram illustrating a main configuration of a projector 1 of a first embodiment.

The projector 1, as illustrated in FIG. 1, includes an optical system 2, a control unit 3 that controls operation of the projector 1, and an exterior casing 4 that constitutes the exterior. The optical system 2 includes a lighting device 21, a color separation optical system 22, liquid crystal light valves 23R, 23G, and 23B as an optical modulation device, a cross dichroic prism 24 as a color combining optical device, a projection optical device 25, and an optical component casing 26. Although illustration is omitted, in addition to above-described the optical system 2 and the control unit 3, the projector 1 includes the lighting device 21 or a power supply device that supplies power to the control unit 3 and the optical system 2 or a cooling device to cool the power supply device, and these devices are provided in the exterior casing 4.

The lighting device 21 includes a light source device 211, an electro-optical device 5, lens arrays 212 and 213, a polarization conversion element 214, and a superimposing lens 215.

The light source device 211 includes a plurality of light emitting elements 211*a* as alight source and a retaining portion 211*b* retaining the plurality of light emitting elements 211*a*. The light emitting element 211*a* is a semiconductor laser, and emits excitation light (for example, blue light).

The electro-optical device 5 includes a light converging optical system 51, a wavelength conversion element 52, a motor 53 as a driving unit, a cable 54 as a connecting portion, a collimating optical system 55, a storage casing 6, and a closing portion 7. The wavelength conversion element 52 corresponds to the optical component, and the motor 53 corresponds to the electronic component.

The light converging optical system 51 includes a plurality of first lenses 511 that are disposed corresponding to the plurality of light emitting elements 211*a* and a second lens 512 on which light is incident in common via the plurality of first lenses 511, and converges excitation light emitted from the light source device 211.

The wavelength conversion element 52 includes a circular plate 521 and a fluorescent substance 522 provided on the circular plate 521 in a circumferential direction.

The circular plate 521 is formed with a member that transmits light emitted from the light emitting element 211a, for example, quartz glass, crystal, sapphire, and the like.

The fluorescent substance 522 is disposed on an opposite side to the light converging optical system 51 of the circular plate 521, and is disposed to overlap with a focal position of light converged by the light converging optical system 51. The fluorescent substance 522 transmits a part of light (blue light) emitted from the light source device 211, and absorbs the rest to emit visible light (yellow light in the first embodiment). The light emitted from the fluorescent substance 522 constitutes white light in which blue light and yellow light are combined.

The motor 53 is connected to a center of the circular plate 521 and is provided to be rotatable around the wavelength conversion element 52 taking the normal line passing through the center of the circular plate 521 as the rotation axis. The cable 54 has a plurality of signal lines, and electrically connects the motor 53 with the control unit 3. The cable 54 has a connector (not illustrated) attachably and detachably connected to the control unit 3. The motor 53 rotates the circular plate 521 based on an instruction of the control unit 3. As the wavelength conversion element 52 is rotated by the motor 53, a specific position of the fluorescent substance 522 is not continuously irradiated with excitation light, so that thermal deterioration is prevented and the life of the wavelength conversion element 52 can be prolonged.

The collimating optical system 55 includes a first lens 551 for suppressing spread of light emitted from the fluorescent substance 522 and a second lens 552 for collimating light incident from the first lens 551, and collimates the light emitted from the fluorescent substance 522.

The storage casing 6 includes a casing main body 61 and a light transmitting member 62, and stores an optical component (light converging optical system 51, wavelength conversion element 52, collimating optical system 55), and an electronic component (motor 53). The retaining portion 211b in the light source device 211 includes a heat sink (not illustrated), and forms apart of the storage casing 6. The heat sink is disposed to face an outer surface side of the storage casing 6, and is cooled by air blown from a fan (not illustrated).

The casing main body 61 is configured by combining a plurality of members, and an insertion hole 61h (see FIG. 3) through which the cable 54 is inserted is formed, which will be described later in detail.

The light transmitting member 62 is disposed on a light emitting side of the collimating optical system 55 and transmits white light emitted from the collimating optical system 55.

As will be described in detail later, the closing portion 7 is attachably and detachably fixed to the storage casing 6 and closes the insertion hole 61h through which the cable 54 is inserted. Then, the closing portion 7 is fixed to the storage casing 6, thereby forming a sealed space that prevents dust intruding from the outside.

The lens array 212 has a configuration in which small lenses are arranged in a matrix, and divides the light emitted from the collimating optical system 55 into a plurality of partial lights. The lens array 213 has substantially the same configuration as the lens array 212, and together with the superimposing lens 215, substantially overlaps the plurality of partial lights on the surfaces of the liquid crystal light valves 23R, 23G, 23B. The polarization conversion element 214 converts the unpolarized light emitted from the lens array 213 into linearly polarized light usable by the liquid crystal light valves 23R, 23G, and 23B.

The color separation optical system 22 includes dichroic mirrors 221 and 222, mirrors 223, 224, and 225, field lenses 226R, 226G, and 226B, and relay lenses 227 and 228.

The dichroic mirror 221 reflects the green light (G light) and the blue light (B light) out of the light L emitted from the lighting device 21, and transmits the red light (R light). The dichroic mirror 222 reflects the G light out of the light reflected by the dichroic mirror 221 and transmits the B light.

The R light transmitted through the dichroic mirror 221 is reflected by the mirror 223, collimated by the field lens 226R, and then incident on the liquid crystal light valve 23R. The G light reflected by the dichroic mirror 222 is collimated by the field lens 226G and then incident on the liquid crystal light valve 23G. The B light transmitted through the dichroic mirror 222, passes through the relay lens 227, and is reflected by the mirror 224. Then, the B light passes through the relay lens 228, is reflected by the mirror 225, and incident on the field lens 226B. The B light incident on the field lens 226B is collimated and then incident on the liquid crystal light valve 23B.

The liquid crystal light valves 23R, 23G, and 23B include a transmissive liquid crystal panel and incident side polarizing plates and emission side polarizing plates respectively disposed on both sides of the liquid crystal panel, and are connected to the control unit 3 via cables (not illustrated). The liquid crystal light valves 23R, 23G, and 23B modulate the respective color lights emitted from the color separation optical system 22 based on supplied image signals to form image light of each color.

The cross dichroic prism 24 has a substantially square shape bonded with four right angle prisms in plan view, and two dielectric multilayer films are formed on an interface where the right angle prisms are bonded to each other. The cross dichroic prism 24 reflects the R light and the B light respectively modulated by the liquid crystal light valves 23R and 23B, transmits the G light modulated by the liquid crystal light valve 23G, and combines the three color image lights.

The projection optical device 25 is configured with a plurality of lenses (not illustrated), and enlarges and projects the image light synthesized by the cross dichroic prism 24 onto a projection surface SCR such as a screen.

The optical component casing 26 stores optical components disposed from a latter stage side of the optical path of the electro-optical device 5 to a preceding stage side of the optical path of the projection optical device 25 on the optical path of the optical system 2.

The control unit 3 includes a central processing unit (CPU), a read only memory (ROM), a random access memory (RAM), and the like, functions as a computer, and controls the operation of the projector 1, for example, control related to projection of an image, drive control of the motor 53, or the like.

[Configuration of Closing Portion]

Here, the closing portion 7 will be described in detail.

Figure 2:
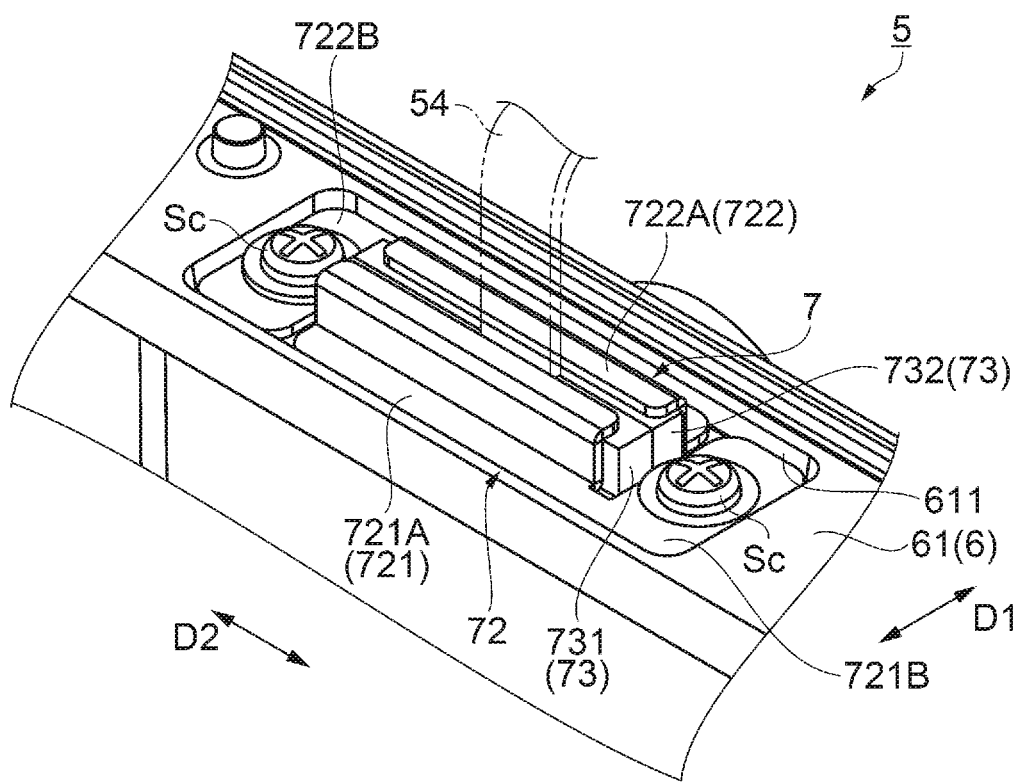
FIG. 2 is a perspective diagram illustrating a part of the electro-optical device in the first embodiment.
Figure 3:
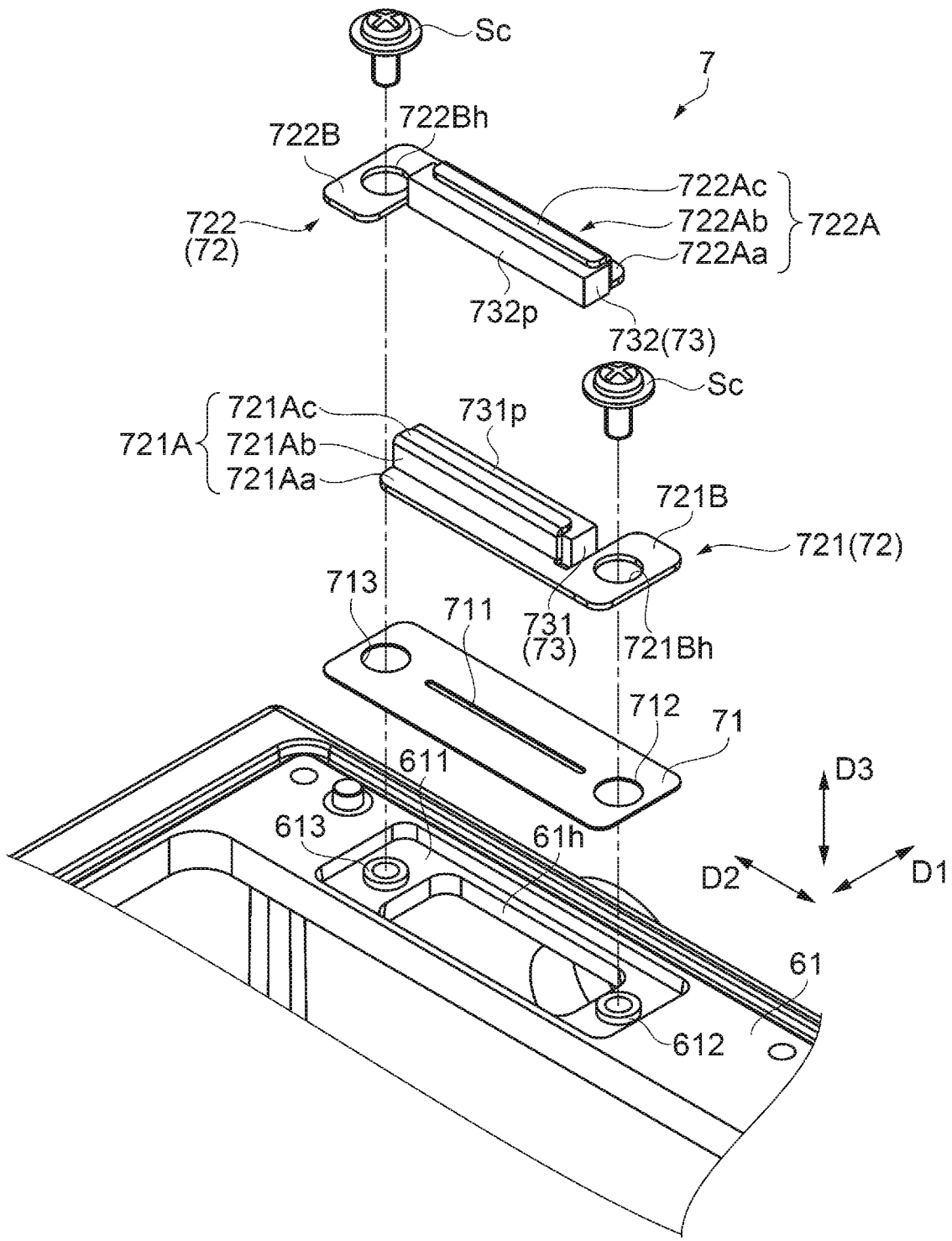
FIG. 3 is an exploded perspective diagram of a casing main body and a closing portion in the first embodiment.

FIG. 2 is a perspective view illustrating a part of the electro-optical device 5, and is a diagram illustrating a part of the casing main body 61 in the vicinity of the closing portion 7 and the closing portion 7. FIG. 2 is a diagram schematically illustrating the cable 54 with a two-dot chain line in order to facilitate recognition of the constituent elements. FIG. 3 is an exploded perspective diagram of the casing main body 61 and the closing portion 7.

First, the shape of the insertion hole 61h of the casing main body 61 and the vicinity of the insertion hole 61h will be described.

As illustrated in FIG. 3, a recessed portion 611 having a rectangular shape in a plan view is provided on the outer surface of the casing main body 61, and the insertion hole 61h is formed on the bottom surface of the recessed portion 611. A lateral direction of the recessed portion 611 is referred to as a first direction D1, and a longitudinal direction (direction intersecting (orthogonal in first embodiment) first direction D1) is referred to as a second direction D2.

Similarly to the recessed portion 611, the insertion hole 61h is formed such that the length in the second direction D2 is longer than the length in the first direction D1. Further, the insertion hole 61h is formed to have such a size that the connector (not illustrated) of the cable 54 can be inserted.

On the bottom surface of the recessed portion 611, a cylindrical first positioning projection 612 and a second positioning projection 613 are provided on both sides of the insertion hole 61h in the second direction D2. A screw hole is formed in the center of each of the first positioning projection 612 and the second positioning projection 613. The first positioning projection 612 and the second positioning projection 613 have a function of positioning the closing portion 7 (fixing portion 72 described later), and correspond to a positioning portion.

Next, the closing portion 7 will be described.

The closing portion 7 is disposed in the recessed portion 611 and closes the insertion hole 61h through which the cable 54 is inserted as described above.

As shown in FIG. 3, the closing portion 7 includes a light shielding member 71, a fixing portion 72 that is attachably and detachably fixed to the casing main body 61, and an elastic portion 73 that is fixed to the fixing portion 72.

The light shielding member 71 is formed of a sheet material that shields light emitted from the wavelength conversion element 52 and is disposed in the recessed portion 611. The light shielding member 71 and the elastic portion 73 are provided to reliably prevent light leakage from the insertion hole 61h to the outside of the storage casing 6. The light shielding member 71 has an elongated hole 711 through which the cables 54 are inserted and circular holes 712 and 713 through which the first positioning projections 612 and the second positioning projections 613 are inserted, respectively. The elongated hole 711 is larger than the sectional shape of the cable 54 and smaller than the sectional shape of a connector (not illustrated) of the cable 54. Since the light shielding member 71 is formed of a sheet material, the assembling operator deforms the light shielding member 71 and inserts the connector of the cable 54.

The fixing portion 72 includes a first member 721 and a second member 722.

The first member 721 and the second member 722 are formed of a sheet metal such as stainless steel and have a common shape and dimension. Specifically, the first member 721 has a first opposing portion 721A and a first hole forming portion 721B, and is formed in an L shape in plan view.

The first opposing portion 721A is formed in an elongated shape longer than the length of the insertion hole 61h in the second direction D2, and has a flat portion 721Aa stacked on the upper surface of the light shielding member 71, an upstanding portion 721Ab standing from one end of the lateral direction (first direction D1) of the flat portion 721Aa, and a bent portion 721Ac that is bent from the end of the upstanding portion 721Ab to the side opposite to the flat portion 721Aa. In this manner, the cross section of the first opposing portion 721A is formed in a crank shape.

The first hole forming portion 721B is a portion stacked on the upper surface of the light shielding member 71 together with the flat portion 721Aa. The first hole forming portion 721B protrudes from one end of the flat portion 721Aa in the second direction D2 to the same side of the bent portion 721Ac shorter than the length of the first opposing portion 721A, and a through-hole 721Bh penetrating in a third direction D3 intersecting (orthogonal in first embodiment) in the first direction D1 and the second direction D2 is formed in the center.

Similarly to the first member 721, the second member 722 has a second opposing portion 722A and a second hole forming portion 722B, and the second opposing portion 722A has a flat portion 722Aa, an upstanding portion 722Ab, and a bent portion 722Ac, and a through-hole 722Bh is formed in the second hole forming portion 722B. The first member 721 and the second member 722 are not limited to a sheet metal but may be formed by metal molding or made of a high-strength synthetic resin including glass fiber or the like.

The elastic portion 73 includes a first elastic member 731 fixed to the first opposing portion 721A and a second elastic member 732 fixed to the second opposing portion 722A.

The first elastic member 731 and the second elastic member 732 are formed with a member having elasticity with high heat resistance (for example, silicon foam material) and have a common shape.

As illustrated in FIG. 3, the first elastic member 731 is formed into a rectangular parallelepiped shape longer than the length of the first opposing portion 721A, and is fixed to the upstanding portion 721Ab and the bent portion 721Ac via an adhesive material. Further, the first elastic member 731 protrudes from the bent portion 721Ac to the side where the first hole forming portion 721B protrudes, and is fixed to the first opposing portion 721A.

Similarly to the first elastic member 731, the second elastic member 732 protrudes from the bent portion 722Ac, and is fixed to the upstanding portion 722Ab and the bent portion 722Ac. A portion protruding from the bent portion 721Ac of the first elastic member 731 is defined as a first protruding portion 731p and a portion protruding from the bent portion 722Ac of the second elastic member 732 is defined as a second protruding portion 732p.

As illustrated in FIG. 2, the first member 721 to which the first elastic member 731 is fixed and the second member 722 to which the second elastic member 732 is fixed are fixed to the casing main body 61 by using a screw Sc in a state that the cable 54 is inserted into the insertion hole 61h and the elongated hole 711.

Figure 4:
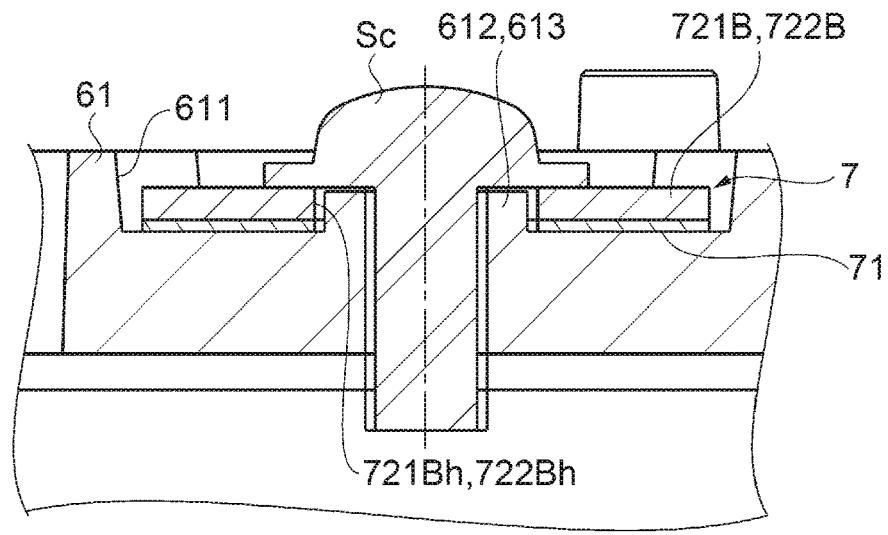
FIG. 4 is a partial sectional diagram of the casing main body to which a closing portion is attached in the first embodiment.

FIG. 4 is a partial sectional diagram of the casing main body 61 to which the closing portion 7 is attached, and is a cross-sectional diagram taken along a plane extending along the first direction D1 through the center of the screw Sc. As shown in FIGS. 3 and 4, in the first member 721, the first positioning projection 612 is inserted into the through-hole 721Bh, and the screw Sc inserted from the through-hole 721Bh is inserted into the screw hole of the first positioning projection 612 and is fixed in the recessed portion 611. In the second member 722, the second positioning projection 613 is inserted into the through-hole 722Bh, and the screw Sc inserted from the through-hole 722Bh is inserted into the screw hole of the second positioning projection 613 and is fixed in the recessed portion 611.

As illustrated in FIG. 2, the first opposing portion 721A and the second opposing portion 722A of the first member 721 and the second member 722 are disposed opposite to each other with the cable 54 protruding from the insertion hole 61h (see FIG. 3) interposed therebetween. The first opposing portion 721A and the second opposing portion 722A are opposed to each other in the first direction and the first opposing portion 721A and the second opposing portion 722A extend in the second direction D2.

In addition, the first member 721 and the second member 722 are disposed so that the first hole forming portion 721B, the first opposing portion 721A, the second hole forming portion 722B, and the second opposing portion 722A surround the cable 54. In addition, each of the first opposing portion 721A and the second opposing portion 722A is positioned to approach each other with a rotation about each screw hole of the first positioning projection 612 and the second positioning projection 613 in a clockwise direction with respect to the first hole forming portion 721B and the second hole forming portion 722B as viewed from the side opposite to the casing main body 61 (viewed from head side of screw Sc).

Figure 5:
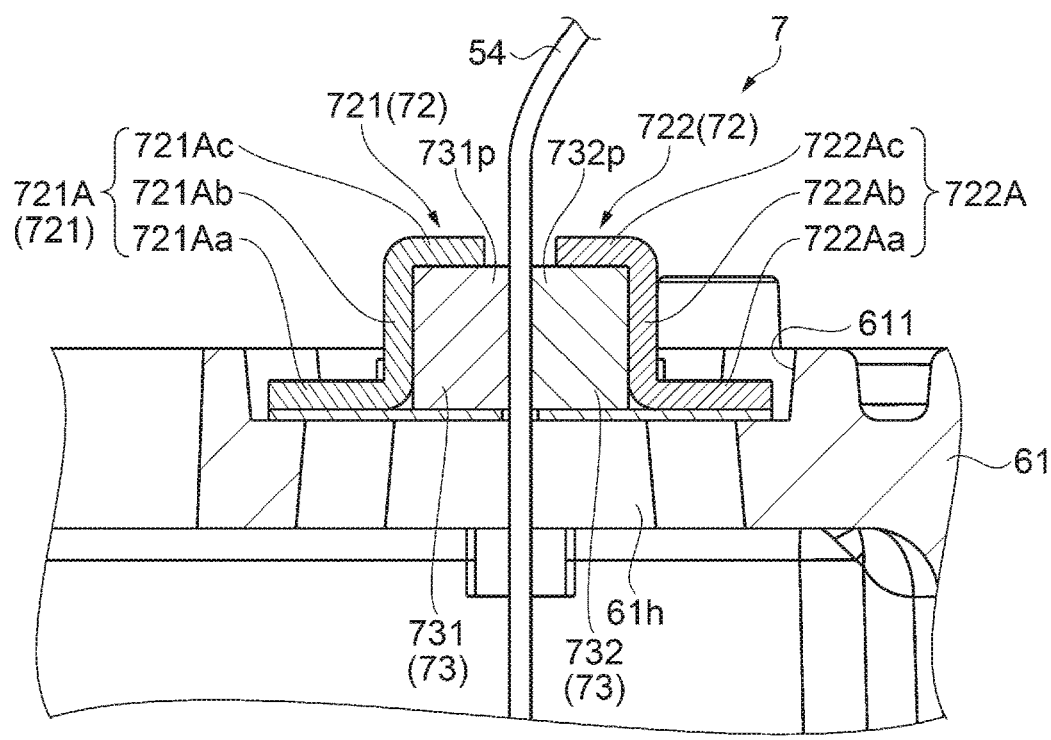
FIG. 5 is a partial sectional diagram of the casing main body to which the closing portion is attached in the first embodiment.

FIG. 5 is a partial sectional diagram of the casing main body 61 to which the closing portion 7 is attached, and is a cross-sectional diagram taken along a plane extending along the first direction D1 through the first protruding portion 731p and the second protruding portion 732p.

As shown in FIGS. 2 and 5, the first protruding portion 731p and the second protruding portion 732p are pressed against each other with the cable 54 interposed therebetween, and are disposed so as to surround the vicinity of the cable 54. As a result, the insertion hole 61h is closed by the fixing portion 72 and the elastic portion 73. In addition, even when the first protruding portion 731p and the second protruding portion 732p are pressed against each other, the protruding amount and hardness that the cable 54 does not come in contact with the first member 721 (first opposing portion 721A) and the second member 722 (second opposing portion 722A) are set.

As described above, according to the first embodiment, the following effects can be achieved.

(1) In the storage casing 6, since a sealed space that prevents dust intruding from the outside is formed by the closing portion 7, adhesion of dust to the wavelength conversion element 52 in the storage casing 6 can be prevented. Therefore, it is possible to provide the electro-optical device 5 that can sufficiently exert the optical performance of the wavelength conversion element 52 while controlling the motor 53 from the outside of the storage casing 6.

In addition, in a configuration different from the present example in which the elastic member is attached to the peripheral edge of the insertion hole 61h via the adhesive material such as a double-sided tape or the like in order to close the insertion hole 61h, an operation for securing sealing property or the replacement operation accompanying the deterioration of the elastic member is complicated. However, according to the configuration of the embodiment, it is possible to secure the sealing property or replace the fixing portion 72 to which the elastic portion 73 is fixed with an easy operation such as fixing or detaching the fixing portion 72.

(2) Since the wavelength conversion element 52 rotates by the motor 53, the area of the fluorescent substance 522 to which the excitation light is irradiated moves, thereby preventing the fluorescent substance 522 from becoming locally high temperature. Accordingly, it is possible to provide the lighting device 21 that suppresses thermal deterioration of the fluorescent substance 522 and illuminates the area to be illuminated over a long period of time.

Further, since the wavelength conversion element 52 is disposed in the storage casing 6, dust is prevented from adhering to the surface of the fluorescent substance. Therefore, it is possible to provide the lighting device 21 capable of suppressing the absorption or scattering of the excitation light or the emission light from the fluorescent substance 522 due to the dust, emitting light with enhanced light utilization efficiency, and replacing the fixing portion 72 to which the elastic portion 73 is fixed with easy operation.

Since the projector 1 includes the lighting device 21, it is possible to project an image in which reduction in brightness is suppressed over a long period of time.

(3) The storage casing 6 has the first positioning projection 612 and the second positioning projection 613 for positioning the first member 721 and the second member 722 such that the first opposing portion 721A and the second opposing portion 722A are disposed opposite to each other. Thereby, the fixing portion 72 to which the elastic portion 73 is fixed with a simple configuration and simple operation can be disposed at a predetermined position of the storage casing 6, and the insertion hole 61h through which the cable 54 is inserted can be sealed.

(4) In the closing portion 7, the first member 721 and the second member 722 are formed in common, and the first elastic member 731 and the second elastic member 732 are formed in common. Since the first member 721 and the second member 722 are formed in an L shape in a plan view and are disposed so as to surround the cable 54, the first member 721 and the second member 722 are disposed compactly around the cable 54. Therefore, it is possible to provide the electro-optical device 5 provided with simplified manufacturing and the small closing portion 7.

(5) Each of the first opposing portion 721A and the second opposing portion 722A is positioned to approach each other by the rotation about the respective screw holes of the first positioning projection 612 and the second positioning projection 613 in a clockwise direction with respect to each of the first hole forming portion 721B and the second hole forming portion 722B as viewed from the head side of the screw Sc. Thereby, it is possible to reliably realize a configuration in which the first protruding portion 731p and the second protruding portion 732p are pressed against each other with the cable 54 interposed therebetween by using a standard right-handed screw with an easy operation.

(6) Since the first opposing portion 721A and the second opposing portion 722A are formed in a crank shape in section, deflection and the like are suppressed. Therefore, even with a configuration that one end portion of each of the first opposing portion 721A and the second opposing portion 722A is screwed, the closing portion 7 can reliably seal the insertion hole 61h through which the cable 54 is inserted.

(Second Embodiment)

Hereinafter, a projector according to the second embodiment will be described with reference to the drawings. In the following description, the same reference numerals are given to the same constituent elements as those of the first embodiment, and a detailed description thereof will be omitted or simplified.

Figure 6:
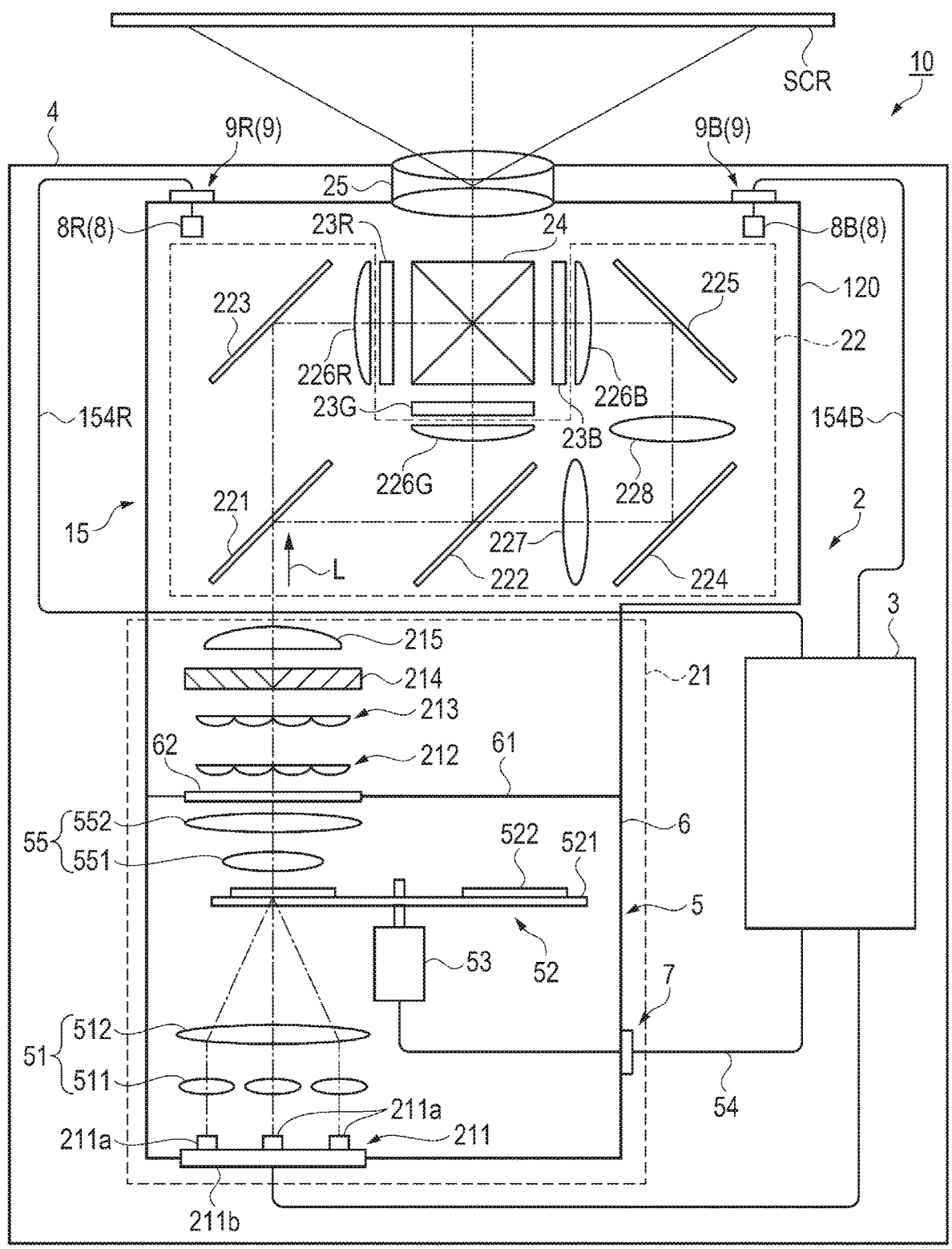
FIG. 6 is a schematic diagram illustrating a main configuration of a projector of a second embodiment.

FIG. 6 is a schematic diagram showing a main configuration of a projector 10 according to the second embodiment.

The projector 10 of the second embodiment includes the electro-optical device 5 and an electro-optical device 15 different from the electro-optical device 5. As shown in FIG. 6, the projector 10 includes an optical component casing 120 having a shape and constituent members different from those of the optical component casing 26 in the projector 1 of the first embodiment, a detection unit 8 not provided in the projector 1 of the first embodiment, the closing portion 9, and a circulation device (not illustrated) that constitutes a part of the cooling device. The detection unit 8 includes illuminance sensors 8B and 8R as electronic components.

The optical component casing 120 stores optical components the same as the optical component stored in the optical component casing 26 of the first embodiment, and the illuminance sensors 8B and 8R, and corresponds to a storage casing. In the optical component casing 120, insertion holes 120h (see FIG. 8, the insertion hole through which the cable 154R is inserted is not illustrated) through which cables 154B and 154R as connecting portions are inserted are formed respectively.

The closing portion 9 includes a closing portion 9B which closes the insertion hole 120h through which the cable 154B is inserted and a closing portion 9R which closes an insertion hole (not illustrated) through which the cable 154R is inserted. By fixing the closing portion 9, the optical component casing 120 forms a sealed space in which air does not easily flow in from the outside. In other words, the electro-optical device 15 includes the optical component casing 120, an optical component disposed in the optical component casing 120, the detection unit 8, the cables 154B and 154R, and the closing portion 9. The light emitted from the plurality of light emitting elements 211a and passed via the wavelength conversion element 52 and the like is incident onto the electro-optical device 15. Then, the projection optical device 25 projects the light emitted from the electro-optical device 15.

As shown in FIG. 6, the illuminance sensor 8B is disposed on the side opposite to the reflection surface of the mirror 225, and the illuminance sensor 8R is disposed on the side opposite to the reflecting surface of the mirror 223.

The mirror 225 reflects about 99% of the incident B light but transmits about 1% of the remaining B light. The illuminance sensor 8B detects the illuminance of the B light transmitted through the mirror 225 and outputs the detection result to the control unit 3 via the cable 154B. Similarly, the mirror 223 reflects about 99% of the incident R light, but transmits about 1% of the remaining R light. The illuminance sensor 8R detects the illuminance of the R light transmitted through the mirror 223 and outputs the detection result to the control unit 3 via the cable 154R. Based on the detection results output from the illuminance sensors 8B and 8R, the control unit 3 drives a light control device (not illustrated) to adjust the amount of light incident on the mirrors 223 and 225, that is, the liquid crystal light valves 23R and 23B.

The circulation device (not illustrated) includes a cooling fan, a heat exchanging portion, and the like, circulates air in the optical component casing 120, and cools the optical components such as the liquid crystal light valves 23R, 23G, and 23B. Although detailed explanation will be omitted, the optical component is cooled as summarized below. The cooling fan blows cooling air to optical components such as the liquid crystal light valves 23R, 23G, and 23B. A part of the heat exchanging portion is formed so as to straddle the inside and the outside of the optical component casing 120 and transmits the heat inside the optical component casing 120 to a portion disposed outside the optical component casing 120. The heat transmitted to this portion is discharged to the outside of the projector 10 by an exhaust fan (not shown) or the like. Although not illustrated, the cooling fan is connected to the control unit 3 via a cable, and this cable is inserted into a hole formed in the optical component casing 120. This hole is sealed with a cushion material or the like.

Here, the shape around the insertion hole 120h of the optical component casing 120 and the closing portion 9 will be described in detail.

Since the insertion hole through which the cable 154R is inserted and the closing portion 9R are configured similarly to the insertion hole 120h and the closing portion 9B, the insertion hole 120h and the closing portion 9B will be described with a focus here.

Figure 7:
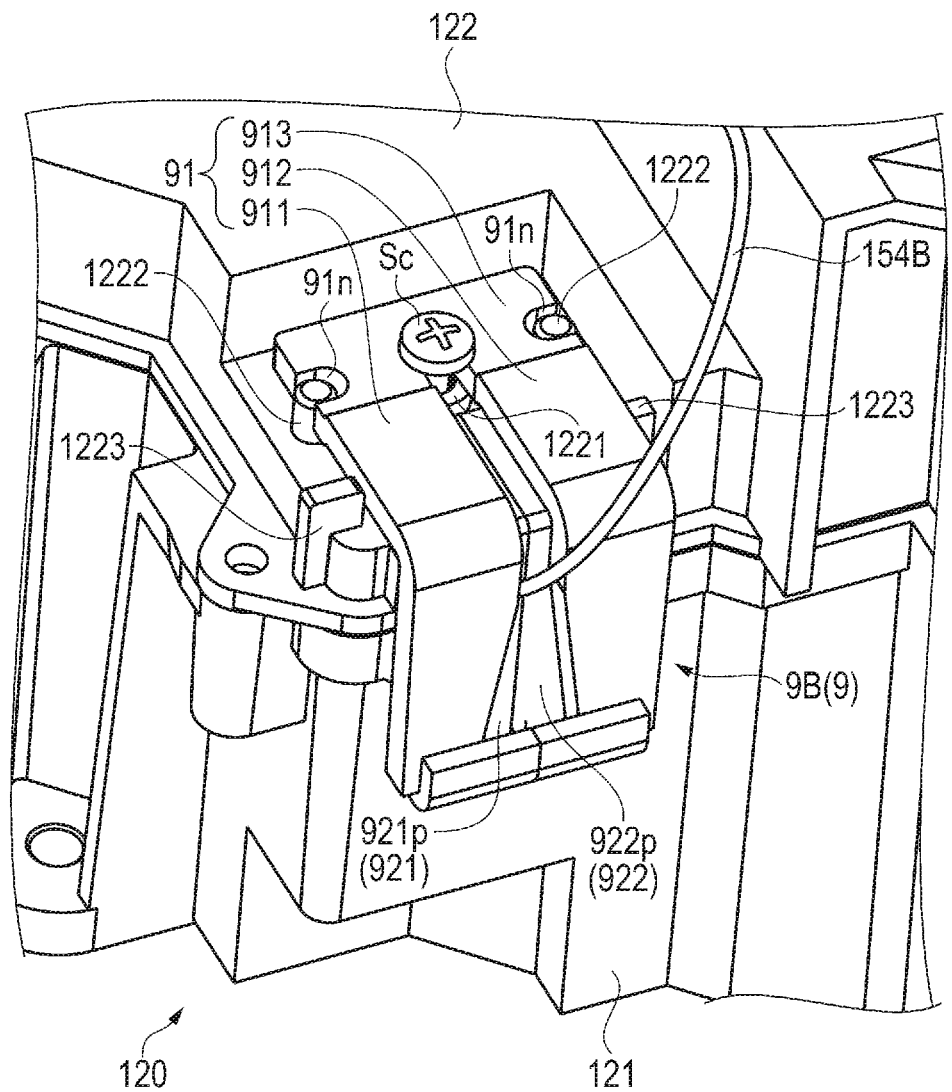
FIG. 7 is a perspective diagram illustrating an optical component casing and a part of a closing portion in the vicinity of the closing portion in the second embodiment.
Figure 8:
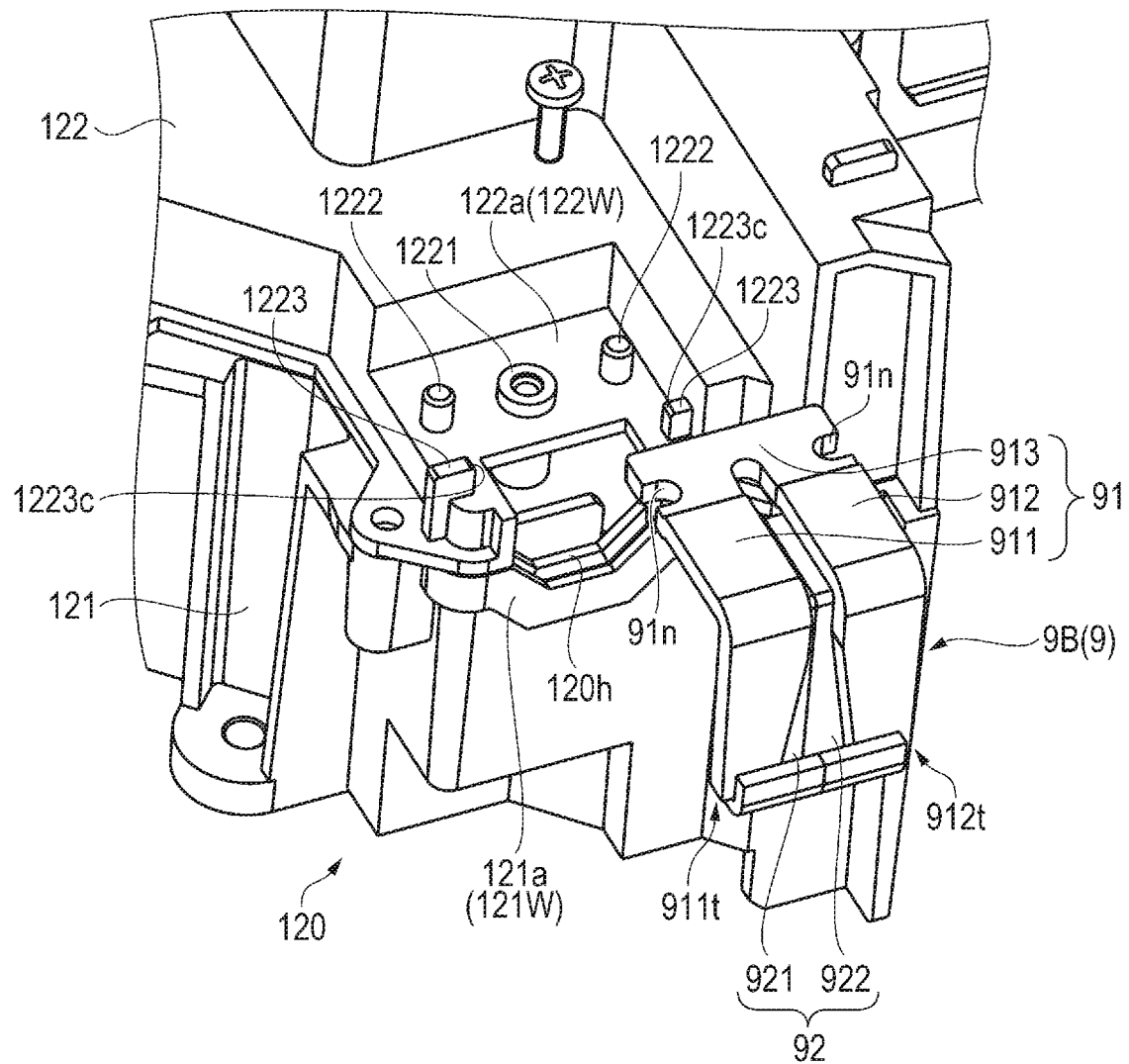
FIG. 8 is an exploded perspective diagram of a part of the optical component casing and the closing portion in the second embodiment.

FIG. 7 is a perspective diagram showing the closing portion 9B and a part of the optical component casing 120 in the vicinity of the closing portion 9B. Although the cable 154B has a plurality of signal lines, FIG. 7 shows the cable 154B with one signal line. FIG. 8 is an exploded perspective diagram of a part of the optical component casing 120 and the closing portion 9B.

First, the shape of the insertion hole 120h and the optical component casing 120 in the vicinity of the insertion hole 120h will be described.

As illustrated in FIGS. 7 and 8, the optical component casing 120 has a first casing 121 forming a lower side and a second casing 122 forming an upper side.

The first casing 121 is formed in a box shape having an opening in the upper portion, and optical components such as the mirrors 223 and 225 (see FIG. 6) are disposed. The second casing 122 is formed like a lid so as to close the opening of the first casing 121.

As shown in FIG. 8, the insertion hole 120h is provided at a corner portion formed with the first casing 121 and the second casing 122. Specifically, the first casing 121 is positioned on the opposite side of the mirror 225 (see FIG. 6) of the illuminance sensor 8B and has a standing wall 121W that has a first outer surface 121a. The opening portion of the first casing 121 opens in a direction along the first outer surface 121a.

The second casing 122 faces the bottom portion of the first casing 121 and has an upper surface portion 122W that has a second outer surface 122a. In other words, the first outer surface 121a and the second outer surface 122a extend in a direction intersecting each other, and the insertion hole 120h is provided at a corner portion formed with the standing wall 121W and the upper surface portion 122W.

As illustrated in FIG. 8, the second casing 122 is formed with a cylindrical portion 1221, a pair of projecting portions 1222, and a pair of holding portions 1223 which are projected from the second outer surface 122a.

The cylindrical portion 1221 is provided in the vicinity of the insertion hole 120h on the side opposite to the first outer surface 121a, and has a screw hole formed in the center.

Each of the pair of projecting portions 1222 has a cylindrical shape and is provided on both sides of the cylindrical portion 1221 interposed therebetween substantially in parallel to the insertion hole 120h. The pair of projecting portions 1222 has a function of positioning the closing portion 9B (fixing portion 91 described later).

The pair of holding portions 1223 has a function of holding the closing portion 9B. Each of the pair of holding portions 1223 protrudes in a plate shape, is provided closer to the first outer surface 121a than the pair of projecting portions 1222, and is disposed opposite to each other via the insertion hole 120h. Further, a chamfer 1223c is formed on opposite side of each of the pair of holding portions 1223.

Next, the closing portion 9B will be described.

As shown in FIGS. 7 and 8, the closing portion 9B includes the fixing portion 91 fixed to the second casing 122 and an elastic portion 92 fixed to the fixing portion 91.

The fixing portion 91 is made of a synthetic resin, and has a first opposing portion 911, a second opposing portion 912, and a base portion 913.

The first opposing portion 911 and the second opposing portion 912 are disposed opposite to each other with the cable 154B protruding from the insertion hole 120h interposed therebetween and are bent along the first outer surface 121a and the second outer surface 122a.

The base portion 913 connects one end sides of the first opposing portion 911 and the second opposing portion 912 which face each other, and is disposed on the upper surface portion 122W. End portions of the first opposing portion 911 and the second opposing portion 912 opposite to the base portion 913 are defined as tip ends 911t and 912t.

The first opposing portion 911 and the second opposing portion 912 are spaced apart from each other from the base portion 913 side to the vicinity of the bent portion by a size through which the screw Sc is inserted, and in a portion along the first outer surface 121a, the first opposing portion 911 and the second opposing portion 912 are formed such that the separated distance gradually increases toward the tip ends 911t and 912t.

In addition, a pair of notches 91n having a semicircular shape in a plan view through which the pair of projecting portions 1222 are respectively inserted are formed in the base portion 913.

Figure 9:
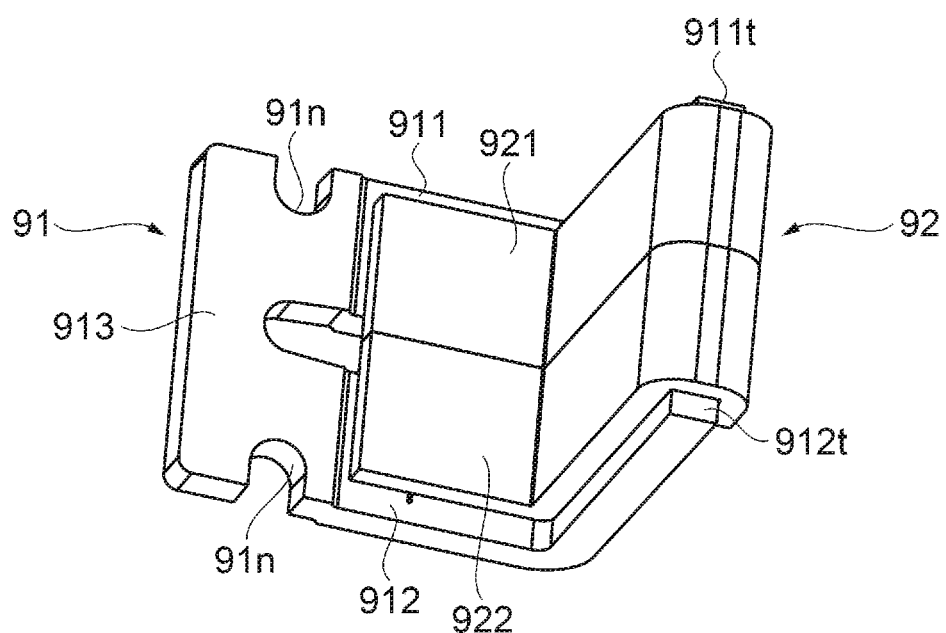
FIG. 9 is a perspective diagram of a fixing portion and an elastic portion fixed to the fixing portion in the second embodiment.

FIG. 9 is a perspective diagram of the fixing portion 91 and the elastic portion 92 fixed to the fixing portion 91 viewed from the optical component casing 120 side.

As shown in FIG. 9, the fixing portion 91 is formed with a step on the inner surface side which is the optical component casing 120 side. Specifically, the inner surface of the fixing portion 91 has a step so that the first opposing portion 911 and the second opposing portion 912 are recessed from the base portion 913.

As shown in FIG. 9, the elastic portion 92 includes a first elastic member 921 fixed to the first opposing portion 911 and a second elastic member 922 fixed to the second opposing portion 912.

The first elastic member 921 and the second elastic member 922 are members having elasticity with high heat resistance (for example, silicon foam material or the like), have a common shape, and are formed in a rectangular plate shape in plan view.

The first elastic member 921 and the second elastic member 922 are respectively fixed to the first opposing portion 911 and the second opposing portion 912 via an adhesive material with reference to a step provided on the inner surface side of the fixing portion 91. Further, the first elastic member 921 and the second elastic member 922 are fixed so as to be in contact with each other. In other words, the first elastic member 921 has a first protruding portion 921p protruding from the first opposing portion 911 toward the second opposing portion 912 side (cable 154B side) and is fixed to the first opposing portion 911. The second elastic member 922 has a second protruding portion 922p protruding from the second opposing portion 912 toward the first opposing portion 911 side (cable 154B side), and is fixed to the second opposing portion 912.

Since the first elastic member 921 and the second elastic member 922 are formed such that the separated distance between the first opposing portion 911 and the second opposing portion 912 is longer than the distance between the tip ends 911t and 912t on the base portion 913 side, and the tip ends 911t and 912t sides are largely deformable by the base portion 913 side. The cable 154B is inserted between the first protruding portion 921p and the second protruding portion 922p from the tip ends 911t and 912t sides. Also, the cable 154B is pulled out from the tip ends 911t and 912t sides even in a case where the closing portion 9 is detached.

In addition, the first elastic member 921 and the second elastic member 922 are formed to a length at which the tip ends 911t and 912t protrude from respectively, and portions protruding from the tip ends 911t and 912t are fixed to the outer surface side of the first opposing portion 911 and the second opposing portion 912 respectively, via an adhesive material. Since the first elastic member 921 and the second elastic member 922 are formed so as to cover the tip ends 911t and 912t, peeling of the first elastic member 921 and the second elastic member 922 is suppressed even when the cable 154B is inserted between the first elastic member 921 and the second elastic member 922 from tip ends 911t and 912t sides. The lengths of the first elastic member 921 and the second elastic member 922 may be set so as not to stick out from the tip ends 911t and 912t.

In the fixing portion 91 to which the first elastic member 921 and the second elastic member 922 are fixed, the cable 154B is inserted between the first protruding portion 921p and the second protruding portion 922p, positioned at the pair of projecting portions 1222, and fixed to the second casing 122 as described above. Specifically, after being positioned at the pair of projecting portions 1222, the fixing portion 91 is pressed toward the second outer surface 122a side and the screw Sc inserted from a portion between the first opposing portion 911 and the second opposing portion 912 in the vicinity of the base portion 913 is inserted into a screw hole of the cylindrical portion 1221 and is fixed to the second casing 122.

Further, when the fixing portion 91 is pressed toward the second outer surface 122a side, the first opposing portion 911 and the second opposing portion 912 are held by the pair of holding portions 1223 in a direction in which the first opposing portion 911 and the second opposing portion 912 are opposed to each other.

In other words, the first opposing portion 911 and the second opposing portion 912 are held so as to be pressed against each other in a direction in which the first opposing portion 911 and the second opposing portion 912 approach each other. Then, as shown in FIG. 7, the first protruding portion 921p and the second protruding portion 922p are pressed against each other with the cable 154B interposed therebetween, and are disposed so as to surround the cable 154B. As a result, the insertion hole 120h is sealed by the fixing portion 91 and the elastic portion 92.

As described above, according to the embodiment, the following effects can be achieved.

(1) By holding the first opposing portion 911 and the second opposing portion 912 with the pair of holding portions 1223, an operator can press against the first protruding portion 921p and the second protruding portion 922p which protrude from the first opposing portion 911 and the second opposing portion 912 respectively and close the insertion hole 120h through which the cable 154B is inserted. Therefore, the closing portion 9 has a simple configuration, and the insertion hole 120h through which the cable 154B is inserted can be sealed with a simple operation so that the intrusion of dust into the optical component casing 120 (storage casing) can be prevented. Accordingly, since adhesion of dust to the optical components disposed in the optical component casing 120 can be prevented, it is possible to sufficiently exert the optical performance of the optical component while controlling the electronic component from the outside.

(2) Since the projector 10 includes the circulation device, it is possible to efficiently cool the optical components in the optical component casing 120.

(3) The insertion hole 120h is provided at a corner portion of the optical component casing 120, and the fixing portion 91 is bent along the first outer surface 121a and the second outer surface 122a positioned on both sides of the corner portion. Accordingly, it is possible to take out the cable 154B connected to the illuminance sensor 8B disposed at the corner of the optical component casing 120 to the outside of the optical component casing 120 in a space efficient manner, and to seal the insertion hole 120h.

(4) In the fixing portion 91, the base portion 913 side is fixed to the second casing 122, and the holding portion 1223 is provided in the second casing 122. Then, the cable 154B is inserted into and pulled out from a portion between the first protruding portion 921p and the second protruding portion 922p from the tip ends 911t and 912t sides. Accordingly, in addition to the easy attachment and detachment of the closing portion 9, it possible to disassemble the first casing 121 and the second casing 122 in a state in which the closing portion 9 is fixed to the second casing 122. Therefore, even when the replacement of the closing portion 9 is not required, it is possible to repair or replace members such as optical components disposed in the first casing 121 without removing the closing portion 9.

(5) Since the projector 10 includes the electro-optical device 15, it is possible to maintain the optical performance of the optical component and to project an image with good image quality over a long period of time.

(Modification Example)

The above-described embodiments may be modified as follows.

Although the first opposing portion 721A and the second opposing portion 722A of the first embodiment are formed in a crank shape in section, the first opposing portion 721A and the second opposing portion 722A may have an L-shaped section or may be flat not having a bent portion.

The first member 721 and the second member 722 of the first embodiment are fixed to the storage casing 6 by screwing one end side (first hole forming portion 721B and second hole forming portion 722B), but it is also possible to provide a portion to be screwed on both end sides and to be fixed to the storage casing 6 by screwing both ends thereof.

Further, the first opposing portion and the second opposing portion may be provided with portions to be engaged with each other on one end side and portions to be screwed may be provided on the other end side respectively, and may be tightened together to the storage casing 6 with an engagement in one end and with a screw in the other end.

Although the lighting device 21 of the first embodiment includes the lens arrays 212 and 213, the polarization conversion element 214, and the superimposing lens 215, the light source device 211 and the electro-optical device 5 not including these members may also be used as the lighting device.

The storage casing 6 of the first embodiment is provided with the light transmitting member 62, but is not provided with the light transmitting member 62, and the entire optical component casing 26 or a part of the optical component casing 26 may form a sealed space with the storage casing 6.

In the second embodiment, the illuminance sensors 8B and 8R are used as electronic components disposed in the optical component casing 120 (storage casing), but the invention is not limited to this. The cooling fan in the circulation device may be configured as an electronic component or a temperature sensor for detecting the temperature inside the optical component casing 120 may be provided and the temperature sensor may be configured as an electronic component. In other words, an insertion hole through which a cable connected to an electronic component such as a cooling fan, a temperature sensor, or the like is inserted may be provided in a storage casing, and may use the closing portion 7 of the first embodiment and the closing portion 9 of the second embodiment to seal the insertion hole. It is also possible to have a configuration in which a connecting portion to be connected to a plurality of electronic components is inserted into one insertion hole and a closing portion for closing the insertion hole is provided.

Although the holding portion 1223 of the second embodiment is provided in the second casing 122, the holding portion 1223 may be provided in the first casing 121. In other words, it may be configured to hold a portion along the first outer surface 121a of the first opposing portion 911 and the second opposing portion 912.

In the second embodiment, although the insertion hole 120h is provided in the corner portion of the storage casing and the first opposing portion 911 and the second opposing portion 912 are formed in a bent shape, the insertion hole may be provided at a portion with a flat shape, and the first opposing portion and the second opposing portion may be formed along with the flat portion.

Although the light source device 211 of the above-described embodiments includes the light emitting element 211a that emits blue light, it is not limited to the blue light. Alight source device including a light emitting element that emits light in another wavelength band, for example, ultraviolet light instead of the blue light may be configured.

Further, although the lighting device 21 of the above-described embodiments includes the fluorescent substance 522 that emits yellow light, it is not limited to yellow light. A lighting device including a fluorescent substance emitting another visible light other than the yellow light may be configured.

Although the lighting device 21 of the above-described embodiments is configured using a semiconductor laser as a light source, it may be a mode in which a semiconductor laser and a light emitting diode (LED) are configured as a light source.

Further, in the second embodiment, instead of the light source device 211 and the electro-optical device 5, a discharge type light source may be used.

Although the projectors 1 and 10 according to the above-described embodiments use the transmissive liquid crystal light valves 23R, 23G, and 23B as an optical modulation device, the projectors 1 and 10 may use a reflective liquid crystal light valve. In addition, a micromirror type optical modulation device, for example, a digital micromirror device (DMD) or the like may be used as the optical modulation device.

The optical modulation device of the above-described embodiments employs a so-called three-plate system using three optical modulation devices corresponding to R light, G light, and B light, but the invention is not limited to this. An optical modulation device adopting a single plate system may be adopted, or may be applied to a projector having two or four or more light modulation devices.

In the above-described embodiments, an example in which the electro-optical device is mounted on the projector has been described, but the technique of the above-described electro-optical device can also be applied to devices and equipment other than the projector.

The entire disclosure of Japanese Patent Application No. 2016-008517, filed on Jan. 20, 2016 is expressly incorporated by reference herein.

The invention claimed is:

1. An electro-optical device comprising:
an electronic component;
an optical component;
a connecting portion that is electrically connected to the electronic component;
a storage casing that stores the electronic component and the optical component, and has an insertion hole through which the connecting portion is inserted;
a fixing portion that is attachably and detachably fixed to the storage casing; and
an elastic portion that is fixed to the fixing portion,
wherein the fixing portion has a first opposing portion and a second opposing portion that are disposed opposite to each other with the connecting portion that protrudes from the insertion hole, interposed therebetween,
wherein the elastic portion has a first protruding portion that protrudes toward the connecting portion side from the first opposing portion, and a second protruding portion that protrudes toward the connecting portion side from the second opposing portion, and
wherein the first protruding portion and the second protruding portion are pressed against each other with the connecting portion interposed therebetween, and disposed so as to surround a vicinity of the connecting portion.

2. The electro-optical device according to claim 1,
wherein the fixing portion includes a first member that has the first opposing portion and a second member that has the second opposing portion,
wherein the elastic portion includes a first elastic member that has the first protruding portion and is fixed to the first opposing portion and a second elastic member that has the second protruding portion and is fixed to the second opposing portion, and
wherein the storage casing has a positioning portion that positions the first member and the second member so that the first opposing portion and the second opposing portion are disposed opposite to each other.

3. The electro-optical device according to claim 2,
wherein the first opposing portion and the second opposing portion extend along a second direction that intersects a first direction that the first opposing portion and the second opposing position are opposite to each other,
wherein the first member has a first hole forming portion that protrudes from one end of the first opposing portion in the second direction and has a through-hole that penetrates the first hole forming portion in a third direction that intersects the first direction and the second direction,
wherein the second member has a second hole forming portion that protrudes from one end of the second opposing portion in the second direction and has a through-hole that penetrates the second hole forming portion in the third direction,
wherein the first protruding portion of the first elastic member is provided on a side that the first hole forming portion of the first opposing portion protrudes,
wherein the second protruding portion of the second elastic member is provided on a side that the second hole forming portion of the second opposing portion protrudes,
wherein, in the storage casing, a first positioning projection and a second positioning projection as the positioning portion that are inserted into each through-hole of the first hole forming portion and the second hole forming portion are formed, and
wherein the fixing portion is disposed so that the first hole forming portion, the first opposing portion, the second hole forming portion and the second opposing portion surround the connecting portion.

4. The electro-optical device according to claim 3,
wherein each of the first positioning projection and the second positioning projection is provided with a screw hole, and
wherein each of the first opposing portion and the second opposing portion is positioned to approach each other by a rotation around each of the screw holes of the first positioning projection and the second positioning projection in a clockwise direction when viewing from an opposite side of the storage casing with respect to each of the first hole forming portion and the second hole forming portion.

5. A lighting device comprising:
a light source that emits excitation light; and
the electro-optical device according to claim 4,
wherein the optical component has a fluorescent substance, and is a wavelength conversion element that emits fluorescence using the excitation light, and
wherein the electronic component is a driving unit that rotates the wavelength conversion element.

6. A lighting device comprising:
a light source that emits excitation light; and
the electro-optical device according to claim 2,
wherein the optical component has a fluorescent substance, and is a wavelength conversion element that emits fluorescence using the excitation light, and
wherein the electronic component is a driving unit that rotates the wavelength conversion element.

7. A lighting device comprising:
a light source that emits excitation light; and
the electro-optical device according to claim 3,
wherein the optical component has a fluorescent substance, and is a wavelength conversion element that emits fluorescence using the excitation light, and
wherein the electronic component is a driving unit that rotates the wavelength conversion element.

8. The electro-optical device according to claim 1,
wherein the fixing portion has a base portion that connects one end sides of the first opposing portion and the second opposing portion that are opposite to each other, and
wherein the storage casing has a holding portion that holds the first opposing portion and the second opposing portion in a direction that the first opposing portion and the second opposing portion are opposite to each other.

9. The electro-optical device according to claim 8,
wherein the storage casing has a corner portion that has a first outer surface and a second outer surface extending in a direction intersecting each other,
wherein the insertion hole is provided on the corner portion, and
wherein the first opposing portion and the second opposing portion are formed along the first outer surface and the second outer surface.

10. The electro-optical device according to claim 9,
wherein the storage casing includes a first casing that has the first outer surface and an opening portion that opens in a direction along the first outer surface and is provided with the optical component, and a second casing that has the second outer surface and closes the opening portion, wherein the base portion side of the fixing portion is fixed to the second casing, and wherein the holding portion is provided in the second casing.

11. A lighting device comprising:

a light source that emits excitation light; and the electro-optical device according to claim 10, wherein the optical component has a fluorescent substance, and is a wavelength conversion element that emits fluorescence using the excitation light, and wherein the electronic component is a driving unit that rotates the wavelength conversion element.

12. A lighting device comprising:

a light source that emits excitation light; and the electro-optical device according to claim 8, wherein the optical component has a fluorescent substance, and is a wavelength conversion element that emits fluorescence using the excitation light, and wherein the electronic component is a driving unit that rotates the wavelength conversion element.

13. A lighting device comprising:

a light source that emits excitation light; and the electro-optical device according to claim 9, wherein the optical component has a fluorescent substance, and is a wavelength conversion element that emits fluorescence using the excitation light, and wherein the electronic component is a driving unit that rotates the wavelength conversion element.

14. A lighting device comprising:

a light source that emits excitation light; and the electro-optical device according to claim 1, wherein the optical component has a fluorescent substance, and is a wavelength conversion element that emits fluorescence using the excitation light, and wherein the electronic component is a driving unit that rotates the wavelength conversion element.

15. A projector that projects an image, comprising:

the lighting device according to claim 14;

an optical modulation device that modulates light emitted from the lighting device;

a projection optical device that projects the light emitted from the optical modulation device; and a control unit that is connected with the connecting portion and controls an operation of the projector.

16. A projector that projects an image, comprising:

a light source;

the electro-optical device according to claim 1 on which light emitted from the light source is incident;

a projection optical device that projects light emitted from the electro-optical device; and a control unit that is connected with the connecting portion and controls an operation of the projector.

\* \* \* \* \*